United States Patent
Sangubhatla et al.

(10) Patent No.: US 12,052,216 B2
(45) Date of Patent: Jul. 30, 2024

(54) USING ENTITY NAME MAPPING FOR ROUTING NETWORK TRAFFIC HAVING ENCRYPTED SERVER NAME IDENTIFICATION (SNI) HEADERS

(71) Applicant: Microsoft Technology Licensing, LLC, Redmond, WA (US)

(72) Inventors: Murali Krishna Sangubhatla, Fremont, CA (US); Shyamshankar Dharmarajan, Sunnyvale, CA (US); Guy Lewin, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/555,409

(22) Filed: Dec. 18, 2021

(65) Prior Publication Data
US 2023/0198938 A1 Jun. 22, 2023

(51) Int. Cl.
 H04L 61/4511 (2022.01)
 H04L 45/302 (2022.01)
 H04L 61/5007 (2022.01)

(52) U.S. Cl.
 CPC ...... H04L 61/4511 (2022.05); H04L 45/3065 (2013.01); H04L 61/5007 (2022.05)

(58) Field of Classification Search
 CPC ..... H04L 45/74; H04L 47/2433; H04L 63/06; H04L 63/029; H04L 63/101; H04L 43/0888; G06N 3/09; G06F 21/554
 See application file for complete search history.

(56) References Cited

U.S. PATENT DOCUMENTS

| | | | |
|---|---|---|---|
| 9,237,168 B2* | 1/2016 | Wang | H04L 63/166 |
| 10,924,456 B1 | 2/2021 | Moore et al. | |
| 2013/0290699 A1* | 10/2013 | Bollay | H04L 63/166 713/151 |
| 2013/0332986 A1* | 12/2013 | Sima | H04L 63/20 726/1 |

(Continued)

FOREIGN PATENT DOCUMENTS

EP 3306889 A1 4/2018

OTHER PUBLICATIONS

"International Search Report and Written Opinion Issued in PCT Application No. PCT/US22/052067", Mailed Date: Mar. 30, 2023, 12 Pages.

*Primary Examiner* — Dustin Nguyen
(74) *Attorney, Agent, or Firm* — Wade IP Law PLLC

(57) ABSTRACT

Techniques are described herein that are capable of using entity name mapping for routing network traffic having encrypted SNI headers. A name resolution request that specifies an entity name is intercepted. Translation of the entity name to a representation of an IP address associated with the entity name is caused. A mapping that cross-references the representation of the IP address to the entity name is stored. A data transfer request that requests establishment of a connection to a destination corresponding to the representation of the IP address is intercepted. The data transfer request includes an encrypted SNI header and a payload. Establishment of the connection to the destination is initiated by providing the encrypted SNI header, the payload, and metadata toward the destination. The metadata includes the entity name based on the mapping.

20 Claims, 7 Drawing Sheets

(56) References Cited

U.S. PATENT DOCUMENTS

| | | | | |
|---|---|---|---|---|
| 2016/0028607 | A1* | 1/2016 | Weill | H04L 63/0428 |
| | | | | 709/224 |
| 2016/0094581 | A1* | 3/2016 | Kasbekar | H04L 63/166 |
| | | | | 713/151 |
| 2018/0198823 | A1* | 7/2018 | Johansson | H04L 63/06 |
| 2019/0028439 | A1* | 1/2019 | Moore | H04L 47/2433 |
| 2020/0204519 | A1* | 6/2020 | Isaev | H04L 63/029 |
| 2020/0374314 | A1* | 11/2020 | Kampanakis | H04L 63/101 |
| 2021/0112040 | A1* | 4/2021 | Niemi | H04L 63/0485 |
| 2022/0021651 | A1* | 1/2022 | Moore | H04L 63/0414 |
| 2022/0086691 | A1* | 3/2022 | Ihlar | H04L 45/38 |
| 2022/0150143 | A1* | 5/2022 | Liu | H04L 43/0888 |
| 2022/0174044 | A1* | 6/2022 | Konda | H04L 63/0272 |
| 2022/0200891 | A1* | 6/2022 | Keeler | H04L 45/74 |
| 2023/0024018 | A1* | 1/2023 | Vega | G06N 3/09 |
| 2023/0130418 | A1* | 4/2023 | Alam | G06F 21/554 |
| | | | | 726/4 |

* cited by examiner

USING ENTITY NAME MAPPING FOR ROUTING NETWORK TRAFFIC HAVING ENCRYPTED SERVER NAME IDENTIFICATION (SNI) HEADERS

BACKGROUND

Transport Layer Security (TLS) is a cryptographic protocol configured to provide security for communications that are sent over a computer network. In particular, the TLS protocol is intended to provide privacy and data integrity for applications that communicate via the computer network. For instance, a client that executes an application can negotiate with a server to establish a stateful connection therebetween using a TLS handshaking process. During the TLS handshaking process, the client and the server can agree on parameters that are used to establish security of the connection.

Server Name Indication (SNI) is an extension to the TLS protocol. The SNI extension enables a client to specify, at the beginning of the TLS handshaking process, a hostname of an entity to which the client is attempting to connect. The client typically includes the hostname in an SNI header that is part of a ClientHello message generated by the client in accordance with the TLS protocol.

Conventional edge servers (e.g., forward proxy servers and security services and appliances, such as next generation firewalls and cloud native firewalls) often rely on SNI headers to enforce Layer 7 security policies. For instance, the edge servers typically review the SNI headers to determine where payloads associated with the SNI headers are to be routed. However, beginning with TLS 1.3, which was defined in August 2018, edge servers are unable to use the SNI headers to identify the intended destinations of the payloads because TLS 1.3 and subsequent versions of the TLS protocol require encryption of SNI headers, and each encrypted SNI header can be decrypted only by its intended destination.

SUMMARY

Various approaches are described herein for, among other things, using entity name mapping for routing network traffic having encrypted SNI headers. For instance, the network traffic may be Hypertext Transfer Protocol Secure (HTTPS) traffic. Entity name mapping is a process in which an entity name that is specified by a name resolution request is caused to be translated to a representation of an internet protocol (IP) address. For example, logic in a computing system that receives the name resolution request may translate the entity name to the representation of the IP address locally on the computing system. In another example, the logic may forward the name resolution request to a server that is external to the computing system to enable the server to translate the entity name to the representation of the IP address on behalf of the computing system. As a result of the entity name being mapped to the representation of the IP address, a computing system is capable of routing subsequent data transfer requests (e.g., any portion of the information therein) that identify the representation of the IP address toward a destination associated with the entity name, even though SNI headers in the data transfer requests are encrypted (e.g., even though the computing system is not able to determine the entity name from the SNI headers). For instance, the computing system may provide the data transfer requests to an edge server and enable the edge server to forward the data transfer requests to the destination by informing the edge server of the entity name. A data transfer request is a request to establish a connection between a source and a destination (e.g., to enable transmission of information from the source to the destination and/or from the destination to the source). For instance, the connection may be a Transmission Control Protocol (TCP) connection or a User Datagram Protocol (UDP) connection. Each of the source and the destination may be an application or a computing system (e.g., a computing system that executes the application).

In an example approach of using entity name mapping for routing network traffic having encrypted SNI headers, a name resolution request that is initiated by an application is intercepted. The name resolution request specifies an entity name and requests an IP address associated with the entity name. Translation of the entity name to a representation of the IP address is caused based on an association between the entity name and the representation of the IP address. A mapping that cross-references the representation of the IP address to the entity name is stored. The application is informed that the representation of the IP address corresponds to the entity name. A data transfer request that is initiated by the application is intercepted. The data transfer request includes an encrypted SNI header and a payload. The data transfer request requests establishment of a connection between the application and a destination that corresponds to the representation of the IP address. Establishment of the connection between the application and the destination is initiated by providing the encrypted SNI header, the payload, and metadata toward the destination. The metadata includes the entity name based on the mapping that cross-references the representation of the IP address to the entity name. For instance, the encrypted SNI header, the payload, and the metadata may be provided to an enforcement engine that executes on a server that is between the application and the destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
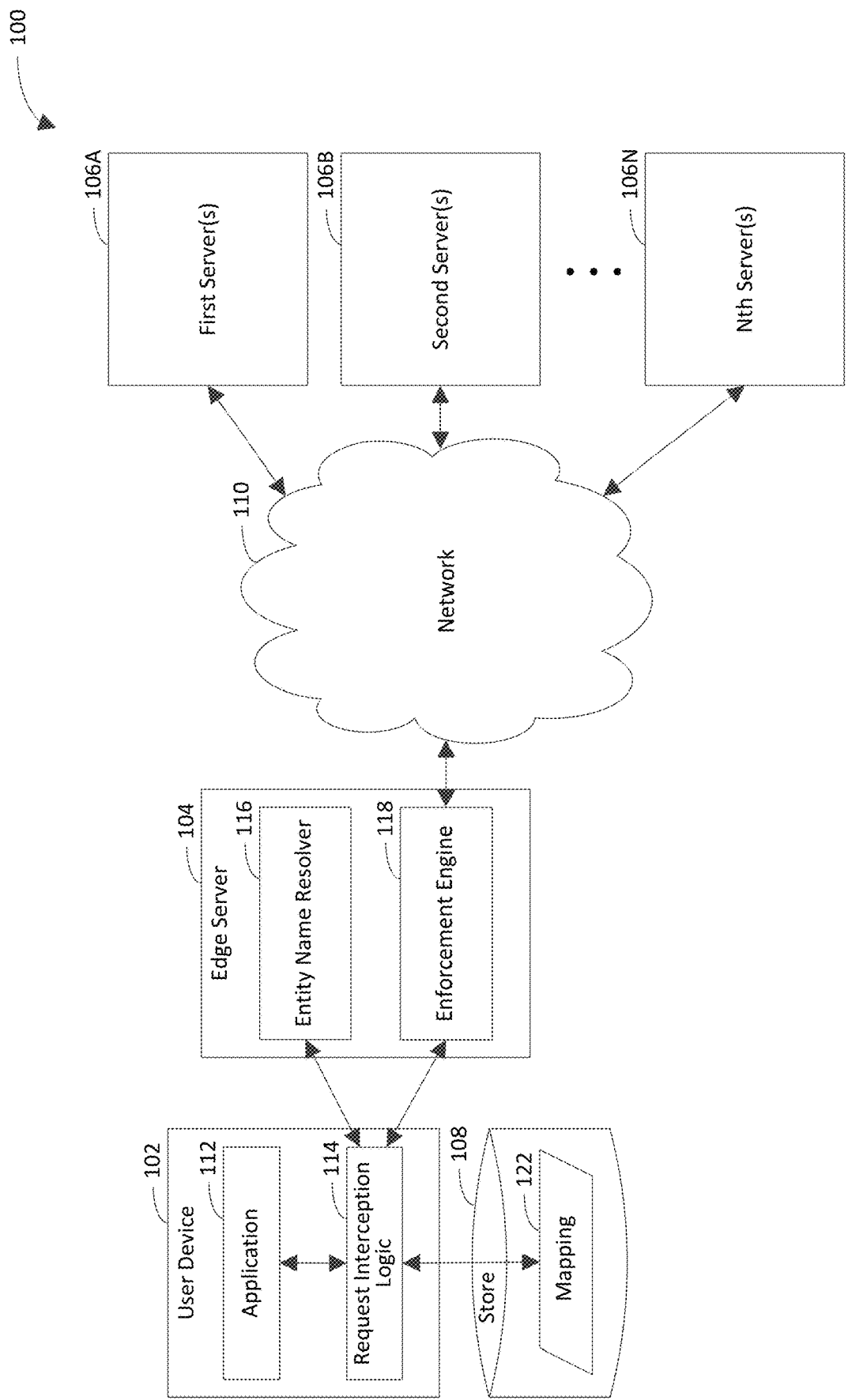
FIGS. 1 and 2 are block diagrams of example request interception systems in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", and "third" are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using entity name mapping for routing network traffic having encrypted SNI headers. For instance, the network traffic may be Hypertext Transfer Protocol Secure (HTTPS) traffic. Entity name mapping is a process in which an entity name that is specified by a name resolution request is caused to be translated to a representation of an internet protocol (IP) address. For example, logic in a computing system that receives the name resolution request may translate the entity name to the representation of the IP address locally on the computing system. In another example, the logic may forward the name resolution request to a server that is external to the computing system to enable the server to translate the entity name to the representation of the IP address on behalf of the computing system. As a result of the entity name being mapped to the representation of the IP address, a computing system is capable of routing subsequent data transfer requests (e.g., any portion of the information therein) that identify the representation of the IP address toward a destination associated with the entity name, even though SNI headers in the data transfer requests are encrypted (e.g., even though the computing system is not able to determine the entity name from the SNI headers). For instance, the computing system may provide the data transfer requests to an edge server and enable the edge server to forward the data transfer requests to the destination by informing the edge server of the entity name. A data transfer request is a request to establish a connection between a source and a destination (e.g., to enable transmission of information from the source to the destination and/or from the destination to the source). For instance, the connection may be a Transmission Control Protocol (TCP) connection or a User Datagram Protocol (UDP) connection. Each of the source and the destination may be an application or a computing system (e.g., a computing system that executes the application).

Example techniques described herein have a variety of benefits as compared to conventional techniques for routing internet traffic. For instance, the example techniques may be capable of increasing security of a computing device and/or an application executing thereon that provides a data transfer request having encrypted SNI header(s). The example techniques may be capable of increasing security of a destination to which the data transfer request is directed. For example, the example techniques may enable a non-malicious computing system to identify an intended destination of the data transfer request without enabling a malicious entity to identify the intended destination. In accordance with this example, the non-malicious computing system may execute an agent of an edge server (e.g., an agent of a service that executes on the edge server), and the agent may be configured to use entity name mapping in accordance any one or more of the techniques described herein to identify the intended destination of the data transfer request. By using entity name mapping to determine the intended destination of the data transfer request, the agent is capable of informing the edge server (e.g., a service that executes thereon) of the intended destination of the data transfer request, enabling the edge server to forward the data transfer request (e.g., any portion of the information therein) toward (e.g., to) the intended destination.

By increasing security of an application that provides a data transfer request having encrypted SNI header(s), a computing system that executes the application, and/or a destination to which the data transfer request is directed, the example techniques may improve (e.g., increase) a user experience of an information technology (IT) professional who manages security of a computer network in which one or more of the example techniques is implemented, increase efficiency of the IT professional, reduce a cost associated with the IT professional managing the security of the computer network, improve a user experience of user(s) of the computer network, and/or increase an efficiency of the user(s).

The example techniques may reduce an amount of time and/or resources (e.g., processor cycles, memory, network bandwidth) that is consumed to manage security of a computer network in which one or more of the example techniques is implemented. For instance, by increasing security of an application that provides a data transfer request having encrypted SNI header(s), a computing system that executes the application, and/or a destination to which the data transfer request is directed, a computing system that is used to manage the computer network may conserve the time and resources that would have been consumed by the computing system to remedy breaches of the security of the application, the computing system that executes the application, and/or the destination that would have occurred in absence of the example technique(s).

FIG. 1 is a block diagram of an example request interception system 100 in accordance with an embodiment. Generally speaking, the request interception system 100 operates to provide information to a user in response to requests (e.g., Hypertext Transfer Protocol (HTTP) requests or HTTP Secure (HTTPS) requests) that are received from the user. The information may include documents (e.g., Web pages, images, audio files, and video files), output of executables, and/or any other suitable type of information. In accordance with example embodiments described herein, the request interception system 100 uses entity name mapping for routing network traffic having encrypted SNI headers. Detail regarding techniques for using entity name mapping for routing network traffic having encrypted SNI headers is provided in the following discussion.

As shown in FIG. 1, the request interception system 100 includes a user device 102, an edge server 104, a plurality of servers 106A-106N, a store 108, and a network 110. Communication between the edge server 104 and the servers 106A-106N is carried out over the network 110 using well-known network communication protocols. The network 110 may be a wide-area network (e.g., the Internet), a local area network (LAN), another type of network, or a combination thereof.

Communication between the user device 102 and the edge server 104 and/or between the user device 102 and the store 108 may be carried out over a network, as well, though the example embodiments are not limited in this respect.

The servers 106A-106N are processing systems that are capable of communicating with the user device 102 (e.g., via the edge server 104). An example of a processing system is a system that includes at least one processor that is capable of manipulating data in accordance with a set of instructions. For instance, a processing system may be a computer. The servers 106A-106N are configured to execute computer programs that provide information to users in response to receiving requests from the users. For example, the information may include documents (e.g., Web pages, images, audio files, and video files), output of executables, or any other suitable type of information. In accordance with some example embodiments, the servers 106A-106N are configured to host respective Web sites, so that the Web sites are accessible to users of the request interception system 100.

The edge server 104 provides an entry point to the network 110 for the user device 102. The edge server 104 may be physically located relatively close to the user device 102. For instance, the edge server 104 may be located within one or two hops from the user device 102 or within a specified distance from the user device 102. The relatively close proximity of the edge server 104 to the user device 102 may reduce latency (e.g., response times) and/or bandwidth utilization of applications that are executed by the user device 102.

The edge server 104 is shown to include an entity name resolver 116 and an enforcement engine 118. The entity name resolver 116 is configured to translate entity names, which are specified by respective name resolution requests that are received from the user device 102, to respective representations of IP addresses based on associations between the entity names and the respective representations. The associations may be pre-defined (e.g., defined prior to receipt of the respective name resolution requests). The associations may be defined by the Domain Name System (DNS). For example, the entity name resolver 116 may review resource records in the DNS to identify the associations. In accordance with this example, the entity name resolver 116 may traverse the resource records in the DNS to locate the entity name that is specified by each name resolution request and cross-reference the entity name with the corresponding representation of the IP address that is identified in the resource records in accordance with the respective association defined by the DNS. In this manner, the entity name resolver 116 may determine the representations of the IP addresses that correspond to the respective entity names. The entity name resolver 116 is further configured to inform the user device 102 of the representations of the IP addresses that correspond to the respective entity names.

The enforcement engine 118 is configured to selectively forward payloads, which are received from the user device 102, to their intended destinations. For instance, the enforcement engine 118 may review metadata associated with each payload to discover an entity name that identifies the intended destination of the respective payload. The enforcement engine 118 reviews configuration policies that specify criteria for allowing network traffic to pass through the edge server 104. If a payload satisfies the criteria of the configuration policies, the enforcement engine 118 passes the payload to its intended destination; otherwise, the enforcement engine 118 does not pass the payload to its intended destination. Accordingly, by enforcing the configuration policies against the payloads, the enforcement engine 118 may forward only those payloads that satisfy the criteria to their intended destinations. Each intended destination may be a server that is included among the servers 106A-106N or an application (e.g., database) hosted by one or more of the servers 106A-106N.

The user device 102 is a processing system that is capable of communicating with the servers 106A-106N (e.g., via the edge server 104). The user device 102 is configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on the user device 102, which is owned by or otherwise accessible to the user. In accordance with some example embodiments, the user device 102 is capable of accessing domains (e.g., Web sites) hosted by the servers 106A-106N, so that the user device 102 may access information that is available via the domains. Such domains may include Web pages, which may be provided as hypertext markup language (HTML) documents and objects (e.g., files) that are linked therein, for example.

The user device 102 may include any client-enabled system or device, including a desktop computer, a laptop computer, a tablet computer, a wearable computer such as a smart watch or a head-mounted computer, a personal digital assistant, a cellular telephone, an Internet of things (IoT) device, or the like. It will be recognized that the user device 102 may communicate with any one or more of the servers 106A-106N (e.g., via the edge server 104).

The user device 102 is shown to include an application 112 and request interception logic 114. For instance, the user device 102 executes the application 112. The application 112 is configured to generate name resolution requests and data transfer requests. Each name resolution request specifies an entity name and requests an IP address associated with the specified entity name. For example, each entity name may identify a destination to which the application 112 intends to send a data transfer request. In response to generating a name resolution request that includes an entity name of a destination, the application 112 may receive a representation of the IP address of the destination.

Each data transfer request requests establishment of a connection between the application 112 and a destination that corresponds to a respective representation of an IP address. For instance, once the application 112 receives a representation of an IP address of a destination in response to a name resolution request, the application 112 may generate a data transfer request that specifies the representation of the IP address so that a connection to the destination may be established. Each data transfer request includes an encrypted SNI header and a payload in accordance with the SNI extension to the TLS protocol.

The request interception logic 114 intercepts name resolution requests that are initiated by the application 112. The request interception logic 114 causes translation of the entity name specified by each name resolution request to a respective representation of an IP address based on an association between the entity name and the representation of the IP address. For example, the request interception logic 114 may forward any one or more of the name resolution requests to the edge server 104 (e.g., the entity name resolver 116 therein) to enable the edge server 104 to translate the entity name specified by each of those name resolution requests to the representation of the respective IP address. In another example, the request interception logic 114 may translate any one or more of the entity names to the representation(s) of the respective IP address(es). In accordance with this example, the request interception logic 114 need not necessarily forward any of the name resolution requests to the edge server 104. For instance, the entity name resolver 116 may be incorporated into the request interception logic 114 (e.g., rather than the edge server 104). The request interception logic 114 stores a mapping 122 that cross-references the representations of the IP address to the respective entity names in the store 108. The request interception logic 114 informs the application 112 of the representations of the IP addresses that correspond to the respective entity names. For instance, by informing the application 112 of the representations of the IP address that correspond to the respective entity names, the request interception logic 114 may enable the application 112 to incorporate the IP addresses into data transfer requests that are directed to destinations associated with those IP addresses. The request interception logic 114 may configure the mapping 122 to persist cross-references (e.g., relationships) for all entity name resolutions or for only specified entity names of interest.

The request interception logic 114 also intercepts data transfer requests that are initiated by the application 112. For each intercepted data transfer request, the request interception logic 114 initiates establishment of a connection between the application 112 and a destination that corresponds to the representation of the IP address that is identified by the data transfer request. The request interception logic 114 initiates establishment of each connection by providing the encrypted SNI header and the payload that are included in the respective data transfer request, along with metadata, toward the respective destination. For instance, request interception logic 114 may initiate establishment of each connection by providing the respective encrypted SNI header, the respective payload, and the respective metadata to the enforcement engine 118. The metadata that is provided to initiate establishment of each connection between the application 112 and the respective destination includes the entity name associated with the respective destination.

For instance, the request interception logic 114 may review the mapping 122, which cross-references the representations of the IP addresses to the respective entity names, to determine the entity name that corresponds to representation of the IP address identified by each data transfer request. In response to determining the entity name for each data transfer request, the request interception logic 114 may incorporate the respective entity name into the metadata that is provided to initiate establishment of the respective connection.

In an example implementation, the request interception logic 114 runs on top of an operating system that executes on the user device 102. In another example implementation, the request interception logic 114 plugs into an operating system that executes on the user device 102. In accordance with this implementation, the request interception logic 114 may plug into the operating system via application programming interfaces (APIs) that are provided by the operating system.

The store 108 stores the mapping 122. It will be recognized that the store 108 may store information in addition to the mapping 122. The store 108 may be any suitable type of store. One suitable type of store is a database. For instance, the store 108 may be a relational database, an entity-relationship database, an object database, an object relational database, or an extensible markup language (XML) database.

The request interception logic 114 may be implemented in various ways to use entity name mapping for routing network traffic having encrypted SNI headers, including being implemented in hardware, software, firmware, or any combination thereof. For example, the request interception logic 114 may be implemented as computer program code configured to be executed in a processing system (e.g., one or more processors). In another example, at least a portion of the request interception logic 114 may be implemented as hardware logic/electrical circuitry. For instance, at least a portion of the request interception logic 114 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 2:
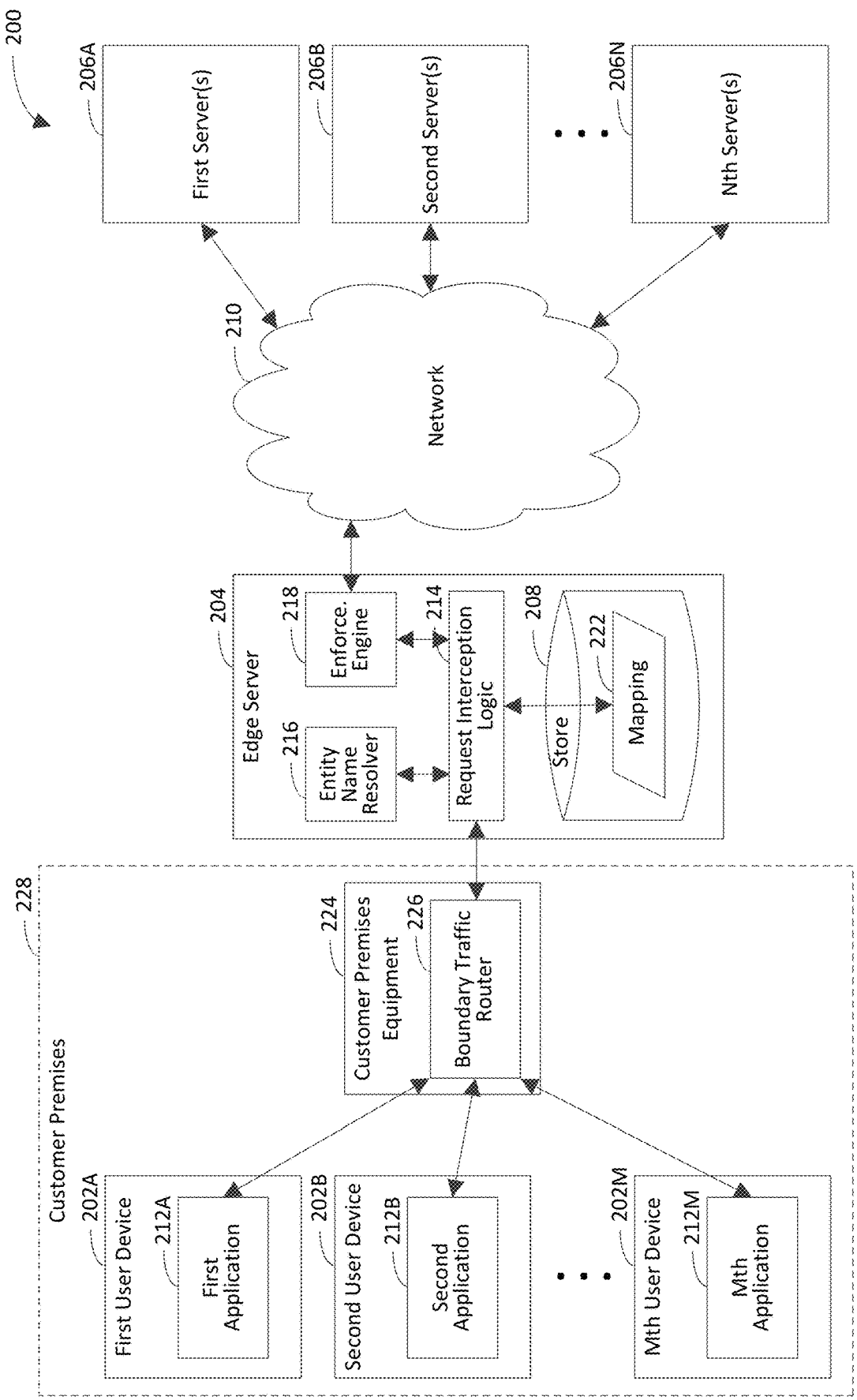

FIG. 2 is a block diagram of another example request interception system 200 in accordance with an embodiment. Generally speaking, the request interception system 200 operates to provide information to users in response to requests (e.g., Hypertext Transfer Protocol (HTTP) requests or HTTP Secure (HTTPS) requests) that are received from the users. As shown in FIG. 2, the request interception system 200 includes a plurality of user devices 202A-202M, customer premises equipment (CPE) 224, an edge server 204, a plurality of servers 206A-206N, and a network 210. Communication between the edge server 204 and the servers 206A-206N is carried out over the network 210 using well-known network communication protocols. Communication between the user devices 202A-202M and the CPE 224 and/or between the CPE 224 and the edge server 204 may be carried out over a network, as well, though the example embodiments are not limited in this respect.

The user devices 202A-202M and the CPE 224 are on customer premises 228. For instance, the customer premises 228 may be the premises of a customer of a service that is provided by the edge server 204. The user devices 202A-202M are processing systems that are capable of communicating with the servers 206A-206N (e.g., via the CPE 224 and the edge server 204). For instance, a processing system may be a computer or a personal digital assistant. The user devices 202A-202M are configured to provide requests to the servers 206A-206N for requesting information stored on (or otherwise accessible via) the servers 206A-206N. For instance, a user may initiate a request for executing a computer program (e.g., an application) using a client (e.g., a Web browser, Web crawler, or other type of client) deployed on a user device 202 that is owned by or otherwise accessible to the user. In accordance with some example embodiments, the user devices 202A-202M are capable of accessing domains (e.g., Web sites) hosted by the servers 206A-206N, so that the user devices 202A-202M may access information that is available via the domains. Such domains may include Web pages, which may be provided as hypertext markup language (HTML) documents and objects (e.g., files) that are linked therein, for example.

Each of the user devices 202A-202M may include any client-enabled system or device, including a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 202A-202M may communicate with any one or more of the servers 206A-206N (e.g., via the CPE 224 and the edge server 204). The user devices 202A-202M execute respective applications 212A-212M. Each of the applications 212A-212M is configured to generate name resolution requests and data transfer requests, which are described in detail above with reference to FIG. 1. For instance, each name resolution request specifies an entity name and requests an IP address associated with the specified entity name. Each data transfer request requests establishment of a connection between the application that generates the data transfer request and a destination that corresponds to a respective representation of an IP address.

The CPE 224 is a processing system (e.g., router, security device, or security stack) that serves as an intermediary (e.g., gateway) between the user devices 202A-202M and the edge server 204. For instance, network traffic (e.g., IP packets and data of sockets) to and from the applications 212A-212M passes through a boundary traffic router 226 that is included in the CPE 224. For example, the CPE 224 may execute the boundary traffic router 226. The boundary traffic router 226 is configured to forward network traffic that is received from the edge server 204 to one or more of the applications 212A-212M depending on which of the applications 212A-212M are identified as destinations by the network traffic. The boundary traffic router 226 is further configured to forward network traffic that is received from the applications 212A-212M to the edge server 204. It will be recognized that the network traffic that is received from the applications 212A-212M may include domain name requests and data transfer requests.

The edge server 204 provides an entry point to the network 210 for the CPE 224 and the user devices 202A-202M. The edge server 204 may be physically located relatively close to the CPE 224. For instance, the edge server 204 may be located within one or two hops from the CPE 224 or within a specified distance from the CPE 224. The relatively close proximity of the edge server 204 to the CPE 224 may reduce latency (e.g., response times) and/or bandwidth utilization of applications 212A-212M that are executed by the respective user devices 202A-202M.

The edge server 204 includes an entity name resolver 216, an enforcement engine 218, request interception logic 214, and a store 208. The entity name resolver 216 is configured to translate entity names, which are specified by respective name resolution requests that are received via the request interception logic 214, to respective representations of IP addresses based on associations between the entity names and the respective representations. It will be recognized that the associations may be defined by the Domain Name System (DNS), though the example embodiments are not limited in this respect. The entity name resolver 216 is further configured to inform the request interception logic 214 of the representations of the IP addresses that correspond to the respective entity names.

The enforcement engine 218 is configured to selectively forward payloads, which are received via the request interception logic 214, to their intended destinations. For instance, the enforcement engine 218 may review metadata associated with each payload to discover an entity name that identifies the intended destination of the respective payload. The enforcement engine 218 reviews configuration policies that specify criteria for allowing network traffic to pass through the edge server 204. If a payload satisfies the criteria of the configuration policies, the enforcement engine 218 passes the payload to its intended destination; otherwise, the enforcement engine 218 does not pass the payload to its intended destination. Each intended destination may be a server that is included among the servers 206A-206N or an application (e.g., database) hosted by one or more of the servers 206A-206N.

The request interception logic 214 may communicate with the boundary traffic router 226 to instruct the boundary traffic router 226 to forward internet traffic that is received from the applications 212A-212M to the edge server 204 (e.g., to the request interception logic 214 therein). The request interception logic 214 may instruct the boundary traffic router 226 to forward all internet traffic that is received from the applications 212A-212M to the edge server 204 or certain types of internet traffic that is received from the applications 212A-212M to the edge server 204. For instance, the request interception logic 214 may instruct the boundary traffic router 226 to forward name resolution requests and/or data transfer requests that are received from the applications 212A-212M to the edge server 204. In an example implementation, the request interception logic 214 may use application programming interfaces (APIs) of an operating system that executes on the CPE 224 to instruct the boundary traffic router 226 to forward the internet traffic or certain types of internet traffic from the applications 212A-212M to the edge server 204. In this manner, the request interception logic 214 may establish a custom protocol between the CPE 224 and the edge server 204 to facilitate such forwarding.

The request interception logic 214 intercepts name resolution requests that pass through the CPE 224 from the applications 212A-212M. The request interception logic 214 causes translation of (e.g., translates) the entity name specified by each name resolution request to a respective representation of an IP address based on an association between the entity name and the representation of the IP address. The request interception logic 214 stores a mapping 222 that cross-references the representations of the IP address to the respective entity names in the store 208. The request interception logic 214 informs each of the applications 212A-212M (e.g., via the CPE 224) of the representations of the IP addresses that correspond to the respective entity names that are specified by the name resolution requests that are received from the respective application. For instance, by informing the applications 212A-212M of the representations of the IP address that correspond to the respective entity names, the request interception logic 214 may enable the applications 212A-212M to incorporate the IP addresses into data transfer requests that are directed to destinations associated with those IP addresses.

The request interception logic 214 also intercepts data transfer requests that pass through the CPE 224 from the applications 212A-212M. For each intercepted data transfer request, the request interception logic 214 initiates establishment of a connection between the application that generated the data transfer request and a destination that corresponds to the representation of the IP address that is identified by the data transfer request. The request interception logic 214 initiates establishment of each connection by providing the encrypted SNI header and the payload that are included in the respective data transfer request, along with metadata, toward the respective destination. For instance, request interception logic 214 may initiate establishment of each connection by providing the respective encrypted SNI header, the respective payload, and the respective metadata to the enforcement engine 218. The metadata that is provided to initiate establishment of each connection between an application and a respective destination includes the entity name associated with the respective destination. For instance, the request interception logic 214 may review the mapping 222, which cross-references the representations of the IP addresses to the respective entity names, to determine the entity name that corresponds to representation of the IP address identified by each data transfer request. In response to determining the entity name for each data transfer request, the request interception logic 214 may incorporate the respective entity name into the metadata that is provided to initiate establishment of the respective connection.

In an example implementation, the request interception logic 214 runs on top of an operating system that executes on the edge server 204. In another example implementation, the request interception logic 214 plugs into an operating system that executes on the edge server 204. In accordance with this implementation, the request interception logic 214 may plug into the operating system via application programming interfaces (APIs) that are provided by the operating system.

The request interception logic 214 may be implemented in various ways to use entity name mapping for routing network traffic having encrypted SNI headers, including being implemented in hardware, software, firmware, or any combination thereof. For example, the request interception logic 214 may be implemented as computer program code configured to be executed in a processing system (e.g., one or more processors). In another example, at least a portion of the request interception logic 214 may be implemented as hardware logic/electrical circuitry. For instance, at least a portion of the request interception logic 214 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

The store 208 stores the mapping 222.

The servers 206A-206N are operable in a manner similar to the servers 106A-106N shown in FIG. 1.

Figure 3:
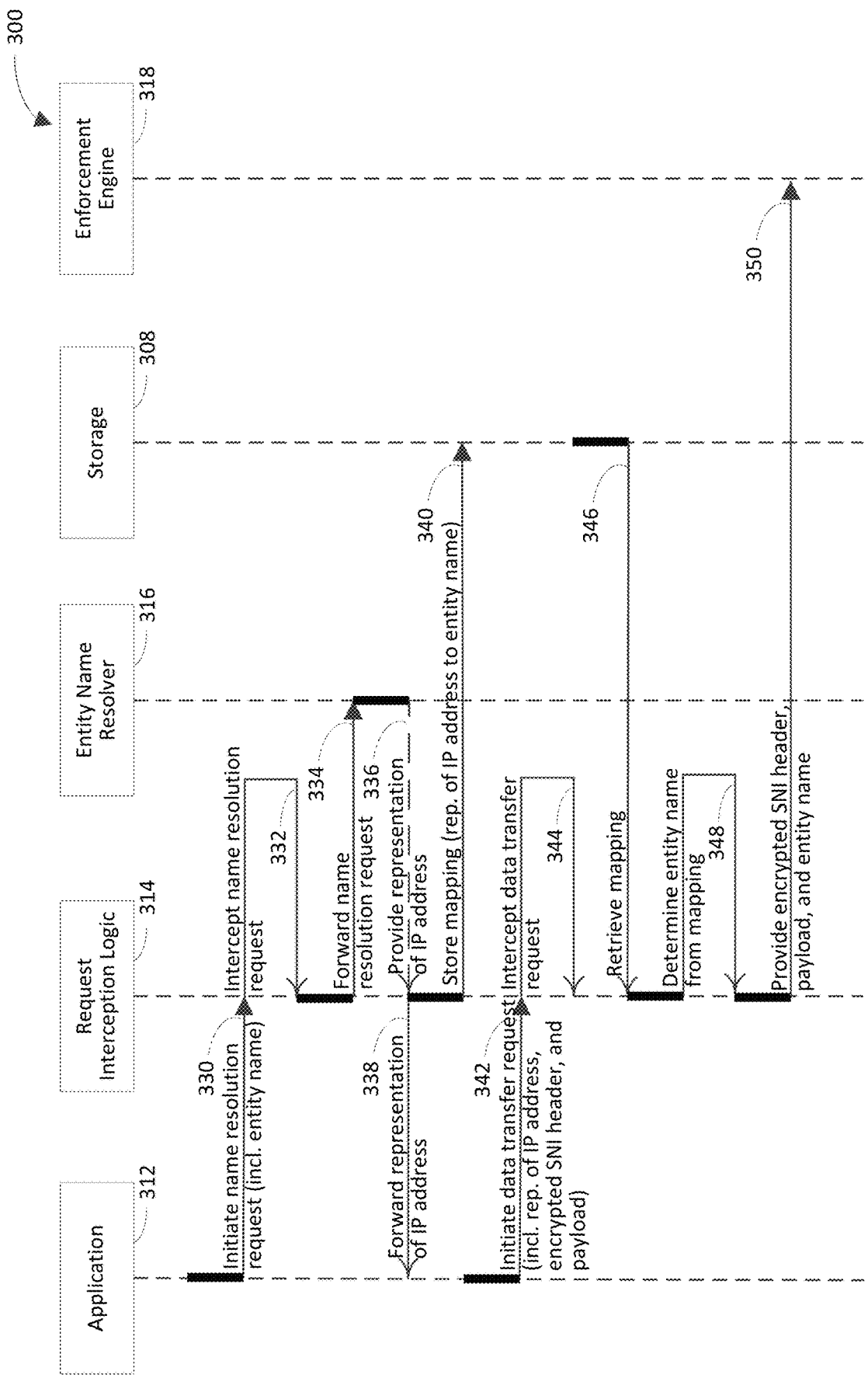
FIG. 3 is an example activity diagram for using entity name mapping for routing network traffic having encrypted SNI headers in accordance with an embodiment.

FIG. 3 is an example activity diagram 300 for using entity name mapping for routing network traffic having encrypted SNI headers in accordance with an embodiment. FIG. 3 depicts an application 312, request interception logic 314, an entity name resolver 316, storage 308, and an enforcement engine 318. Activities 330, 332, 334, 336, 338, 340, 342, 344, 346, 348, and 350 will now be described with reference to the application 312, the request interception logic 314, the entity name resolver 316, the storage 308, and the enforcement engine 318.

In activity 330, the application 312 initiates (e.g., generates) a name resolution request. The name resolution request includes an entity name and requests an IP address that is associated with the entity name. The application 312 may identify the entity name resolver 316 as an intended destination (e.g., intended recipient) of the name resolution request.

In activity 332, the request interception logic 314 intercepts the name resolution request that is initiated by the application 312. For instance, the request interception logic 314 may interrupt (e.g., temporarily block) transmission of the name resolution request to the entity name resolver 316 by taking control of the entity name request.

In activity 334, the request interception logic 314 forwards the name resolution request to the entity name resolver 316. For instance, the request interception logic 314 may allow the transmission of the name resolution request to the entity name resolver 316 to resume.

In activity 336, the entity name resolver 316 provides a representation of the IP address that is associated with the entity name to the request interception logic 314 in response to (e.g., based on) receipt of the name resolution request from the request interception logic 314. It will be recognized that by intercepting the name resolution request and forwarding the name resolution request to the entity name resolver 316 in respective activities 332 and 334, the request interception logic 314 may enable itself to discover the representation of the IP address that is associated with the entity name. Upon receipt of the name resolution request from the request interception logic 314, the entity name resolver 316 may analyze the name resolution request to identify the entity name therein. The entity name resolver 316 may identify the representation of the IP address by using the entity name as a reference (e.g., key) and traversing a list of associations between entity names and respective representations of IP addresses. For example, the association may be defined by a naming system, such as the Domain Name System (DNS). In accordance with this example, the entity name resolver 316 may traverse the resource records of the naming system to identify the representation of the IP address by using the entity name as a reference.

In activity 338, the request interception logic 314 forwards the representation of the IP address to the application 312. By forwarding the representation of the IP address to the application 312, the request interception logic 314 may enable the application 312 to indicate the representation of the IP address in subsequent data transfer requests that are to be directed to a destination associated with the entity name.

In activity 340, the request interception logic 314 stores a mapping of the representation of the IP address to the entity name in the store 308. By storing the mapping in the store 308, the request interception logic 314 may subsequently retrieve the mapping to determine the entity name of the destination when data transfer requests that include the representation of the IP address are received. For instance, the request interception logic 314 may use the mapping to determine that the data transfer requests that include the representation of the IP address are to be routed to the destination having the entity name.

In activity 342, the application initiates a data transfer request, which includes the representation of the IP address, an encrypted SNI header, and a payload.

In activity 344, the request interception logic 314 intercepts the data transfer request.

In activity 346, the request interception logic 314 retrieves the mapping from the store 308.

In activity 348, the request interception logic 314 determines the entity name from the mapping. For instance, the request interception logic 314 may cross-reference the representation of the IP address with the entity name using the mapping to determine the entity name.

In activity 350, the request interception logic 314 provides the encrypted SNI header, the payload, and the entity name to the enforcement engine 318. The entity name may be included in metadata, which is associated with the SNI header and the payload. For instance, the metadata and the payload may be included in headers that are provided to the enforcement engine 318, long with the encrypted SNI header. By providing the encrypted SM header, the payload, and the entity name to the enforcement engine 318, the request interception logic 314 enables the enforcement engine 318 to determine the intended destination of the encrypted SNI header and the payload. For instance, the enforcement engine 318 may route the encrypted SNI header and the payload toward the intended destination based on the entity name, so long as the payload satisfies criteria of configuration policies that are enforced by the enforcement engine 318.

Activities 330, 332, 334, 336, 338, and 340 may be repeated for each new entity name of a destination to which the application 312 intends to send a data transfer request. Activities 342, 344, 346, 348, and 350 may be repeated for each new payload that is to be sent from the application 312 to a destination.

In some example embodiments, one or more of the activities 330, 332, 334, 336, 338, 340, 342, 344, 346, 348, and/or 350 of the activity diagram 300 may not be performed. Moreover, activities in addition to or in lieu of the activities 330, 332, 334, 336, 338, 340, 342, 344, 346, 348, and/or 350 may be performed.

Figure 4:
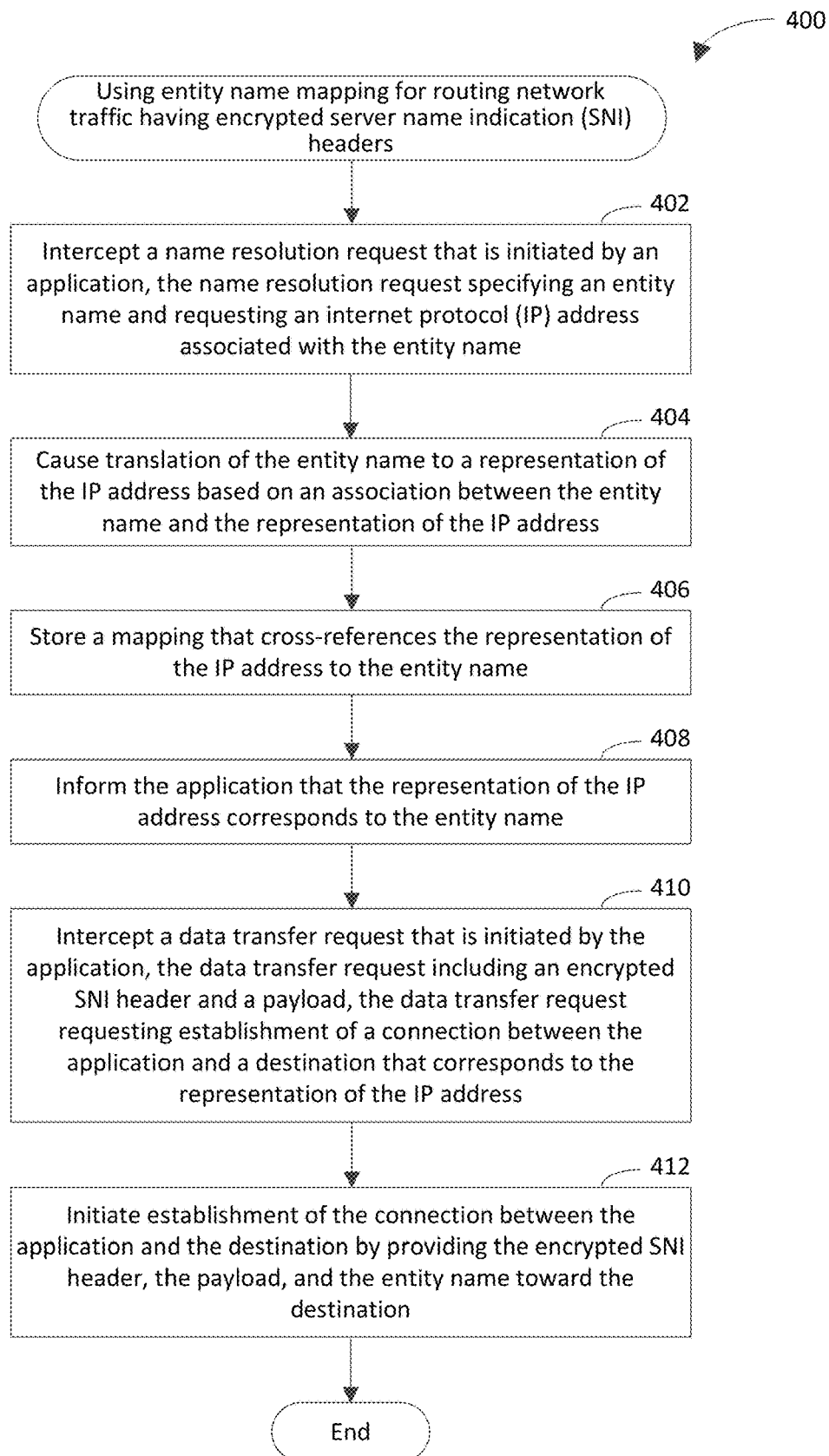
FIG. 4 depicts a flowchart of an example method for using entity name mapping for routing network traffic having encrypted SNI headers in accordance with an embodiment.
Figure 5:
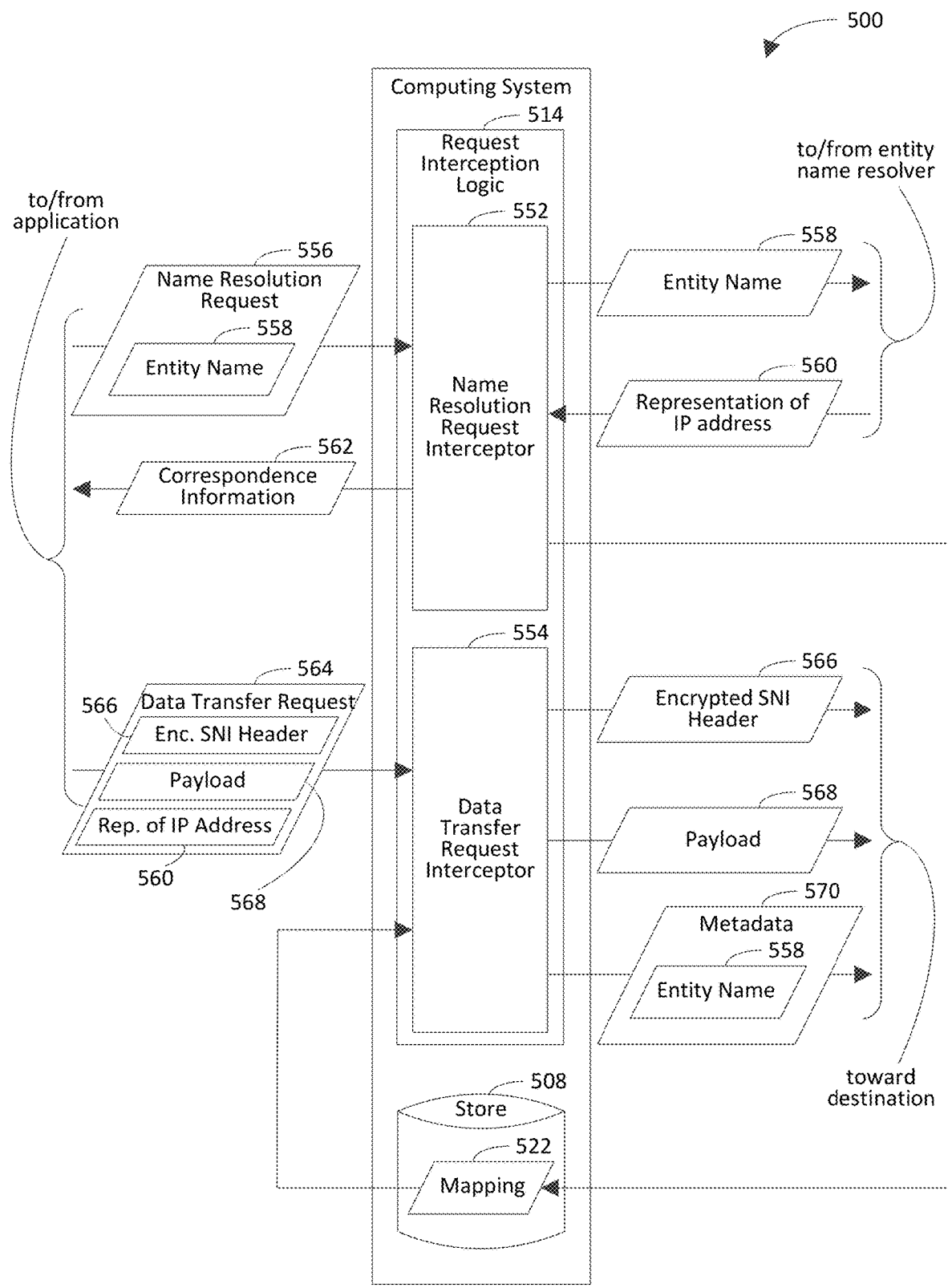
FIG. 5 is a block diagram of an example computing system in accordance with an embodiment.

FIG. 4 depicts a flowchart 400 of an example method for using entity name mapping for routing network traffic having encrypted SNI headers in accordance with an embodiment. Flowchart 400 may be performed by the user device 102 shown in FIG. 1, for example. For illustrative purposes, flowchart 400 is described with respect to computing system 500 shown in FIG. 5, which is an example implementation of the user device 102. As shown in FIG. 5, the computing system 500 includes request interception logic 514 and a store 508. The request interception logic 514 includes a name resolution request interceptor 552 and a data transfer request interceptor 554. The store 508 may be any suitable type of store. One suitable type of store is a database. For instance, the store 508 may be a relational database, an entity-relationship database, an object database, an object relational database, or an extensible markup language (XML) database. The store 508 is shown to store a mapping 522 for illustrative purposes. Further structural and operational embodiments will be apparent to persons skilled in the relevant art(s) based on the discussion regarding flowchart 400.

As shown in FIG. 4, the method of flowchart 400 begins at step 402. In step 402, a name resolution request that is initiated by an application is intercepted. The name resolution request specifies an entity name and requests an internet protocol (IP) address associated with the entity name. The entity name may identify any suitable entity. For instance, the entity name may identify an application, such as a service, a host, or a domain. If the entity is a domain, the entity name may be a fully qualified domain name (FQDN) or a partially qualified domain name (PQDN). For instance, the PQDN may be extended to utilize wildcards and/or subdomains. In an example implementation, the name resolution request interceptor 552 intercepts a name resolution request 556, which is initiated by the application. In accordance with this implementation, the name resolution request 556 specifies an entity name 558 and requests an IP address associated with the entity name 558.

In an example embodiment, the name resolution request is a domain name system (DNS) resolution request. In accordance with this embodiment, the entity name is a domain name. DNS is a hierarchical and decentralized naming system used to identify resources hosted on a network (e.g., the Internet). Examples of DNS include but are not limited to unicast DNS and multicast DNS. The DNS resolution request specifies a domain name and requests an IP address associated with the domain name.

In another example embodiment, the name resolution request is a NetBIOS Name Server (NBNS) resolution request. NBNS is a dynamic peer-to-peer distributed name registration service, which utilizes a central repository for recording name registrations. NBNS may be configured to be hierarchical by adding a "Scope" aspect to the name of a resource. The packet formats of DNS and NBNS are the same, though NBNS has some additional features such as NetBIOS "Node Status" query, dynamic registration, and conflict marking packets.

At step 404, the entity name, which is specified by the name resolution request, is caused to be translated to a representation of the IP address based on an association between the entity name and the representation of the IP address. In an example implementation, the name resolution request interceptor 552 causes the entity name 558 to be translated to a representation of the IP address 560 based on an association between the entity name 558 and the representation of the IP address 560. For example, the name resolution request interceptor 552 may provide the entity name 558 to an entity name resolver (e.g., entity name resolver 116, 216, or 316) for translation of the entity name 558 to the representation of the IP address 560. The entity name resolver may be included in the computing system 514 (e.g., in the request interception logic 514) or located external to the computing system 500. In accordance with this example, the name resolution request interceptor 552 may receive the representation of the IP address 560 from the entity name resolver in response to providing the entity name 558 to the entity name resolver.

In an example embodiment, causing the translation of the entity name to the representation the IP address at step 404 includes forwarding the name resolution request to a server (e.g., a forward proxy server or a firewall), which causes the server to use the association between the representation of the IP address and the entity name to translate the entity name to the representation of the IP address. In accordance with this embodiment, causing the translation of the entity name to the representation the IP address at step 404 further includes receiving the representation of the IP address from the server.

In another example embodiment, causing the translation of the entity name to the representation of the IP address at step 404 includes translating the entity name to the representation of the IP address using a process that executes on a computing system that intercepts the name resolution request.

At step 406, a mapping that cross-references the representation of the IP address to the entity name is stored. For example, the mapping may be a reverse mapping. In accordance with this example, the reverse mapping may be indexed on the representation of the IP address to enable translation from the representation of the IP address to the entity name. In an example implementation, the name resolution request interceptor 552 stores a mapping 522 that cross-references the representation of the IP address 560 to the entity name 558. For instance, the name resolution request interceptor 552 may store the mapping 522 in the store 508, as shown in FIG. 5.

At step 408, the application is informed that the representation of the IP address corresponds to the entity name. In an example implementation, the name resolution request interceptor 552 informs the application that the representation of the IP address 560 corresponds to the entity name 558. For instance, the name resolution request interceptor 552 may generate correspondence information 562, which indicates that the representation of the IP address 560 corresponds to the entity name 558, and the name resolution request interceptor 552 may provide the correspondence information 562 to the application.

At step 410, a data transfer request that is initiated by the application is intercepted. The data transfer request includes an encrypted SNI header and a payload. The data transfer request requests establishment of a connection (e.g., TCP connection or UDP connection) between the application and a destination that corresponds to the representation of the IP address. For instance, the destination may be a destination service or an Internet server. In an example implementation, the data transfer request interceptor 554 intercepts a data transfer request 564 that is initiated by the application. The data transfer request 564 includes an encrypted SNI header 566 and a payload 568. The data transfer request 564 requests establishment of a connection between the application and a destination that corresponds to the representation of the IP address 560.

At step 412, establishment of the connection between the application and the destination is initiated (e.g., caused) by providing the encrypted SNI header, the payload, and the entity name toward the destination. For example, establishment of the connection may be initiated by providing one or more IP packets toward the destination. In accordance with this example, the one or more IP packets include the encrypted SNI header, the payload, and the entity name. In another example, establishment of the connection may be initiated by providing data of one or more sockets toward the destination. In accordance with this example, the one or more sockets include the encrypted SNI header, the payload, and the entity name. In yet another example, the encrypted SNI header, the payload, and the entity name may be provided to an enforcement engine that executes on a server that is between the application and the destination. For instance, the server may be a forward proxy server or a firewall. In still another example, the entity name may be included in metadata that is provided toward the destination based on the mapping that cross-references the representation of the IP address to the entity name. In accordance with this example, the metadata may be associated with the encrypted SNI header and/or the payload. The metadata may include other information, including but not limited to the IP address associated with the entity name, the SNI header, a process identifier (ID) of a process that is used to initiate establishment of the connection, a thread ID of a thread that is used to initiate establishment of the connection, and/or a timestamp to indicate a time at which establishment of the connection is initiated. Any information in the metadata may be stored to uniquely identify subsequent Transmission Control Protocol (TCP) or User Datagram Protocol (UDP) connections to the resolved IP addresses.

In an example implementation, the data transfer request interceptor 554 initiates establishment of the connection between the application and the destination by providing the encrypted SNI header 566, the payload 568, and the entity name 558 toward the destination. For example, the entity name 558 may be included in metadata 570 based on the mapping 522. In accordance with this example, the data transfer request interceptor 554 may provide the metadata 570 toward to the destination, as shown in FIG. 5. The metadata 570 may be encrypted or unencrypted. If the metadata 570 is encrypted, the data transfer request interceptor 554 may generate a decryption key that is usable to decrypt the encrypted metadata. The data transfer request interceptor 554 may provide the decryption key toward the destination to enable the destination to decrypt the encrypted metadata.

The method of flowchart 400 may be IP protocol-agnostic. For example, the method of flowchart 400 can apply to any protocol that requires a name resolution and that requires a binding to the application from which the name resolution request and the data transfer request are received. For instance, the protocol may utilize named pipes. In another example, the method of flowchart 400 may be agnostic to the IP protocol that is utilized by the computing system 500. It will be recognized that the computing system 500 may be a client device that executes the application or a server (e.g., forward proxy server or firewall) that is between the client device and the destination.

The name resolution request and the data transfer request may be intercepted at respective steps 402 and 410 by intercepting IP packets, data of sockets, or a combination thereof. If interception is achieved by intercepting IP packets, a single packet associated with each request may not include sufficient information. For instance, a single packet of the name resolution request may not include the entity name. A single packet of the data transfer request may not include the encrypted SNI header, the payload, and the representation of the IP address. Accordingly, multiple packets associated with each request may be sampled to obtain the desired information.

In an example embodiment, intercepting the name resolution request at step 402 is performed using a first process that executes on a computing system. In accordance with this embodiment, intercepting the data transfer request at step 410 is performed using a second process that executes on the computing system. In further accordance with this embodiment, the second process is different from the first process.

In another example embodiment, intercepting the name resolution request at step 402 and intercepting the data transfer request at step 410 are performed using a same process that executes on a computing system.

In some example embodiments, one or more steps 402, 404, 406, 408, 410, and/or 412 of flowchart 400 may not be performed. Moreover, steps in addition to or in lieu of steps 402, 404, 406, 408, 410, and/or 412 may be performed. For instance, in an example embodiment, the method of flowchart 400 further includes registering an application programming interface (API) of an operating system that executes on a computing system to be a proxy such that the API is configured to receive the name resolution request. In accordance with this embodiment, intercepting the name resolution request at step 402 is performed using the API. In an aspect, the API may be a proprietary API of the operating system.

In another example embodiment, the method of flowchart 400 further includes encrypting the metadata. In accordance with this embodiment, initiating the establishment of the connection at step 412 is performed by providing the encrypted SNI header, the payload, and the encrypted metadata to the enforcement engine.

In yet another example embodiment, the representation of the IP address is different from the IP address that is associated with the entity name. For instance, the representation of the IP address may be a randomly-generated IP address, a semi-randomly-generated IP address, or a predetermined IP address that differs from the IP address that is associated with the entity name. It should be noted that if the IP address associated with the entity name is associated with one or more additional entity names, using a representation of the IP address that is different from the IP address associated with the entity name may enable different representations of the IP address to be used to distinguish between the entity names (and encrypted SNI headers) that are associated with the IP address.

In an aspect of this embodiment, the method of flowchart 400 further includes determining that the representation of the IP address, as indicated by the data transfer request, corresponds to the entity name based on the mapping that cross-references the representation of the IP address to the entity name. For example, the data transfer request interceptor 554 may determine that the representation of the IP address 560, as indicated by the data transfer request 564, corresponds to the entity name 558 based on the mapping 522 that cross-references the representation of the IP address 560 to the entity name 558. In accordance with this example, the data transfer request interceptor 554 may analyze (e.g., review) the data transfer request 564 to identify the representation of the IP address 560 therein and look-up the representation of the IP address 560 in the mapping 522 to determine that the representation of the IP address 560 corresponds to the entity name 558 based on the representation of the IP address 560 being cross-referenced with the entity name 558 in the mapping 558. In accordance with this aspect, the method of flowchart 400 further includes causing translation of the entity name to the IP address based on an association between the entity name and the IP address. For instance, the data transfer request interceptor 554 may cause translation of the entity name 558 to the IP address based on an association between the entity name 558 and the IP address. In further accordance with this aspect, the method of flowchart 400 further includes providing the IP address toward the destination. For instance, the data transfer request interceptor 554 may provide the IP address toward the destination. In an example implementation, the method of flowchart 400 includes incorporating the IP address and the entity name into metadata and providing the metadata toward the destination.

In still another example embodiment, the representation of the IP address is same as the IP address that is associated with the entity name. In an aspect of this embodiment, the method of flowchart 400 further includes providing the representation of the IP address toward the destination. For instance, the data transfer request interceptor 554 may provide the representation of the IP address toward the destination. In an example implementation, the method of flowchart 400 includes incorporating the representation of the IP address and the entity name into metadata and providing the metadata toward the destination. Although it may not be necessary to provide the representation of the IP address toward the destination in order for the data transfer request to be fulfilled, the representation of the IP address may serve as a hint to a server that a computing device that provided the representation of the IP address prefers to use an entity associated with the representation of the IP address as the destination of the encrypted SNI header and the payload.

It will be recognized that the computing system 500 may not include one or more of the request interception logic 514, the store 508, the name resolution request interceptor 552, and/or the data transfer request interceptor 554. Furthermore, the computing system 500 may include components in addition to or in lieu of the request interception logic 514, the store 508, the name resolution request interceptor 552, and/or the data transfer request interceptor 554.

Figure 6:
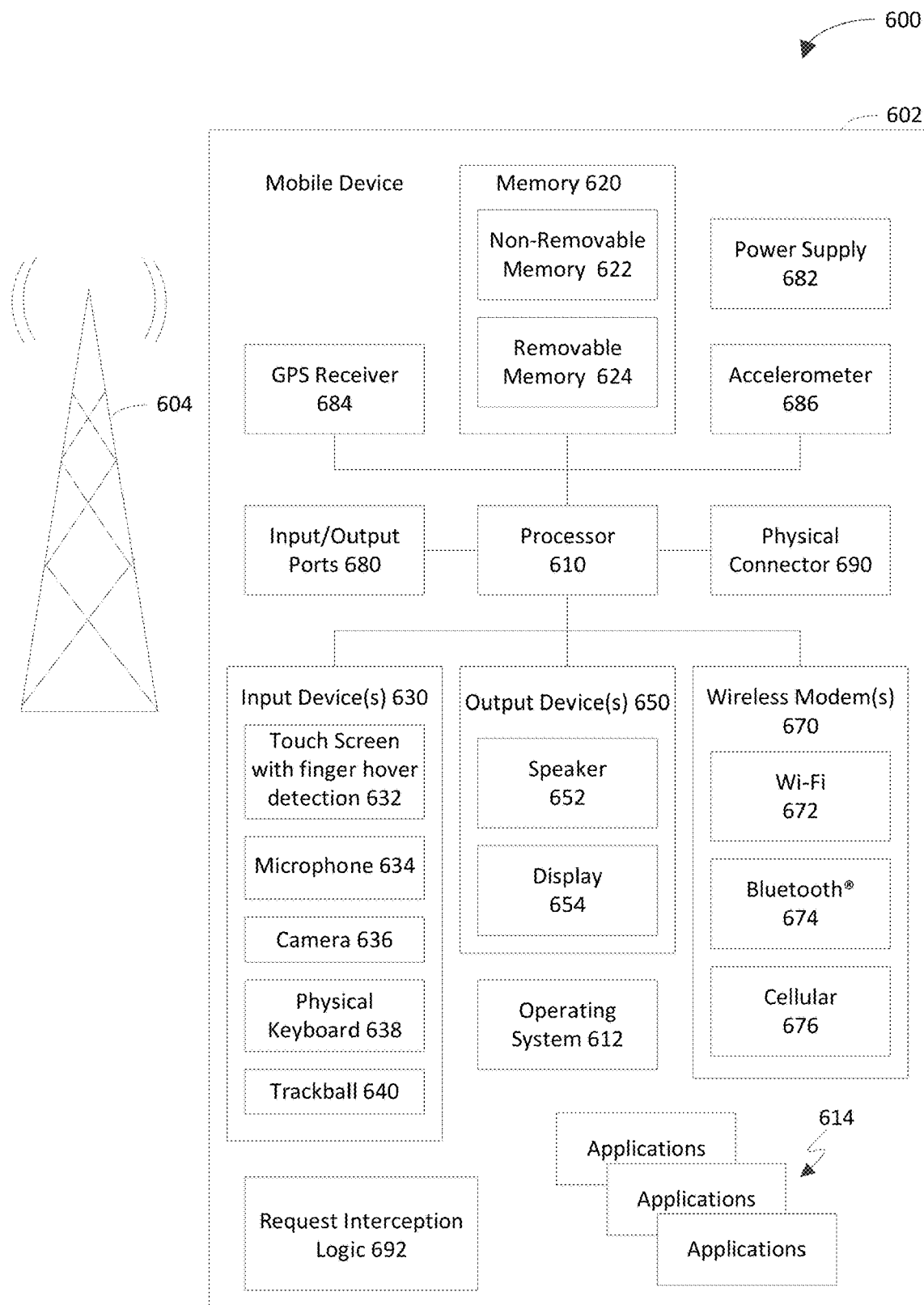
FIG. 6 is a system diagram of an exemplary mobile device in accordance with an embodiment.

FIG. 6 is a system diagram of an exemplary mobile device 600 including a variety of optional hardware and software components, shown generally as 602. Any components 602 in the mobile device may communicate with any other component, though not all connections are shown, for ease of illustration. The mobile device 600 may be any of a variety of computing devices (e.g., cell phone, smartphone, handheld computer, Personal Digital Assistant (PDA), etc.) and may allow wireless two-way communications with one or more mobile communications networks 604, such as a cellular or satellite network, or with a local area or wide area network.

The mobile device 600 may include a processor 610 (e.g., signal processor, microprocessor, ASIC, or other control and processing logic circuitry) for performing such tasks as signal coding, data processing, input/output processing, power control, and/or other functions. An operating system 612 may control the allocation and usage of the components 602 and support for one or more applications 614 (a.k.a. application programs). The applications 614 may include common mobile computing applications (e.g., email applications, calendars, contact managers, web browsers, messaging applications) and any other computing applications (e.g., word processing applications, mapping applications, media player applications).

The mobile device 600 may include memory 620. The memory 620 may include non-removable memory 622 and/or removable memory 624. The non-removable memory 622 may include RAM, ROM, flash memory, a hard disk, or other well-known memory storage technologies. The removable memory 624 may include flash memory or a Subscriber Identity Module (SIM) card, which is well known in GSM communication systems, or other well-known memory storage technologies, such as "smart cards." The memory 620 may store data and/or code for running the operating system 612 and the applications 614. Example data may include web pages, text, images, sound files, video data, or other data sets to be sent to and/or received from one or more network servers or other devices via one or more wired or wireless networks. Memory 620 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 600 may support one or more input devices 630, such as a touch screen 632, microphone 634, camera 636, physical keyboard 638 and/or trackball 640 and one or more output devices 650, such as a speaker 652 and a display 654. Touch screens, such as the touch screen 632, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 632 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 600 may include request interception logic 692. The request interception logic 692 is configured to use entity name mapping for routing network traffic having encrypted SNI headers in accordance with any one or more of the techniques described herein.

Other possible output devices (not shown) may include piezoelectric or other haptic output devices. Some devices may serve more than one input/output function. For example, touch screen 632 and display 654 may be combined in a single input/output device. The input devices 630 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 may include speech-recognition software as part of a voice control interface that allows a user to operate the mobile device 600 via voice commands. Furthermore, the mobile device 600 may include input devices and software that allows for user interaction via a user's spatial gestures, such as detecting and interpreting gestures to provide input to a gaming application.

Wireless modem(s) 670 may be coupled to antenna(s) (not shown) and may support two-way communications between the processor 610 and external devices, as is well understood in the art. The modem(s) 670 are shown generically and may include a cellular modem 676 for communicating with the mobile communication network 604 and/or other radio-based modems (e.g., Bluetooth® 674 and/or Wi-Fi 672). At least one of the wireless modem(s) 670 is typically configured for communication with one or more cellular networks, such as a GSM network for data and voice communications within a single cellular network, between cellular networks, or between the mobile device and a public switched telephone network (PSTN).

The mobile device may further include at least one input/output port 680, a power supply 682, a satellite navigation system receiver 684, such as a Global Positioning System (GPS) receiver, an accelerometer 686, and/or a physical connector 690, which may be a USB port, IEEE 1394 (FireWire) port, and/or RS-232 port. The illustrated components 602 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the request interception logic 114, the entity name resolver 116, the enforcement engine 118, the boundary traffic router 226, the request interception logic 214, the entity name resolver 216, the enforcement engine 218, the request interception logic 314, the entity name resolver 316, the enforcement engine 318, the request interception logic 514, the name resolution request interceptor 552, the data transfer request interceptor 554, the request interception logic 692, activity diagram 300, and/or flowchart 400 may be implemented in hardware, software, firmware, or any combination thereof.

For example, any one or more of the request interception logic 114, the entity name resolver 116, the enforcement engine 118, the boundary traffic router 226, the request interception logic 214, the entity name resolver 216, the enforcement engine 218, the request interception logic 314, the entity name resolver 316, the enforcement engine 318, the request interception logic 514, the name resolution request interceptor 552, the data transfer request interceptor 554, the request interception logic 692, activity diagram 300, and/or flowchart 400 may be implemented, at least in part, as computer program code configured to be executed in one or more processors.

In another example, any one or more of the request interception logic 114, the entity name resolver 116, the enforcement engine 118, the boundary traffic router 226, the request interception logic 214, the entity name resolver 216, the enforcement engine 218, the request interception logic 314, the entity name resolver 316, the enforcement engine 318, the request interception logic 514, the name resolution request interceptor 552, the data transfer request interceptor 554, the request interception logic 692, activity diagram 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
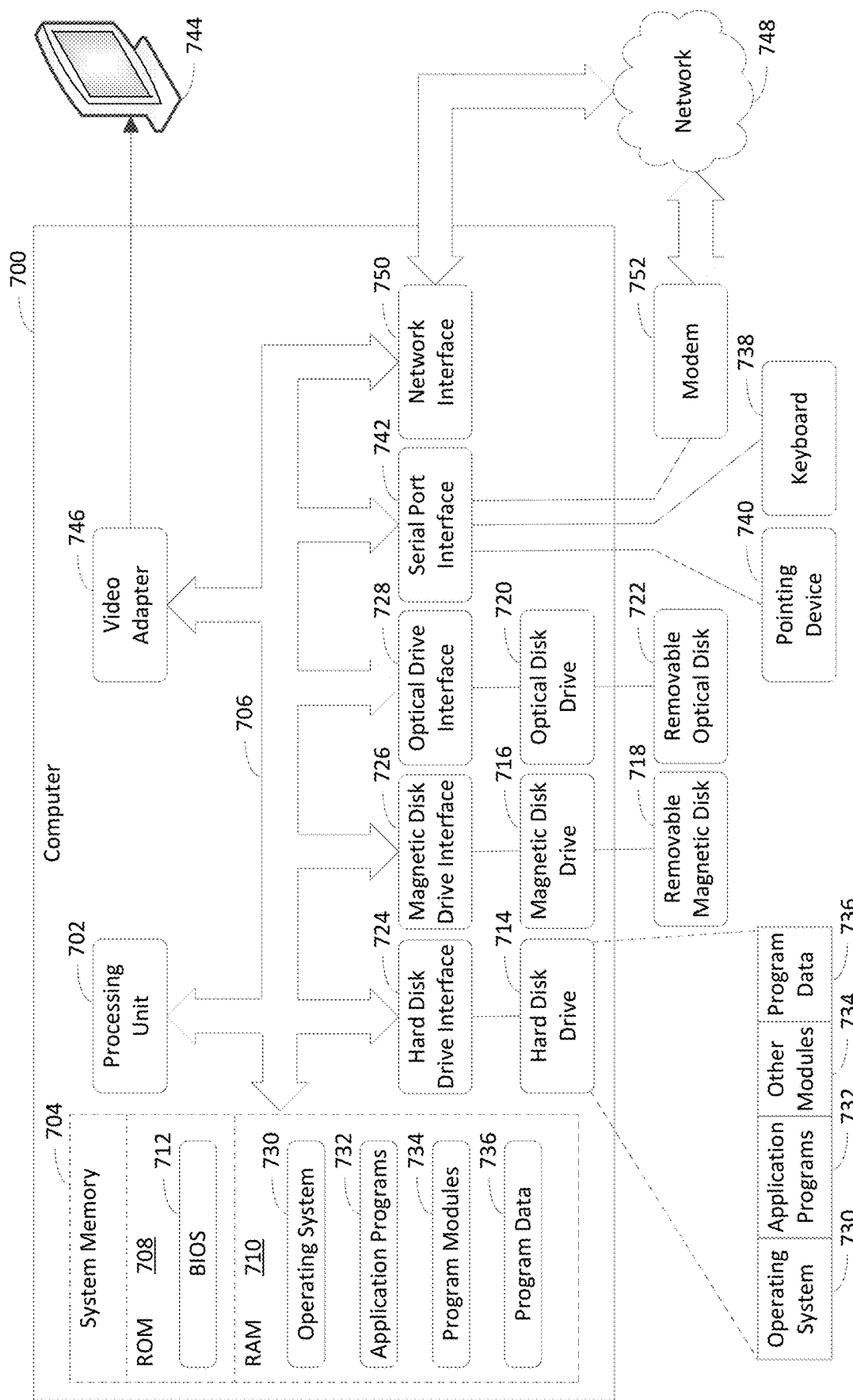
FIG. 7 depicts an example computer in which embodiments may be implemented.

III. Further Discussion of Some Example Embodiments (A1) An example system (FIG. 1, 102; FIG. 2, 202A-202M; FIG. 5, 500; FIG. 6, 602; FIG. 7, 700) to use entity name mapping for routing network traffic having encrypted server name indication (SNI) headers comprises a memory (FIG. 6, 620, 622, 624; FIG. 7, 704, 708, 710) and a processing system (FIG. 6, 610; FIG. 7, 702) coupled to the memory. The processing system is configured to intercept (FIG. 3, 332; FIG. 4, 402) a name resolution request (FIG. 5, 556) that is initiated by an application (FIG. 1, 112; FIG. 2, 212A-212M; FIG. 3, 312). The name resolution request (FIG. 5, 556) specifies an entity name (FIG. 5, 558) and requests an internet protocol (IP) address associated with the entity name (FIG. 5, 558). The processing system is further configured to cause (FIG. 3, 334; FIG. 4, 404) translation of the entity name (FIG. 5, 556), which is specified by the name resolution request (FIG. 5, 556), to a representation of the IP address (FIG. 5, 560) based on an association between the entity name (FIG. 5, 556) and the representation of the IP address (FIG. 5, 560). The processing system is further configured to store (FIG. 3, 340; FIG. 4, 406) a mapping (FIG. 5, 522) that cross-references the representation of the IP address (FIG. 5, 560) to the entity name (FIG. 5, 556). The processing system is further configured to inform (FIG. 3, 338; FIG. 4, 408) the application (FIG. 1, 112; FIG. 2, 212A-212M; FIG. 3, 312) that the representation of the IP address (FIG. 5, 560) corresponds to the entity name (FIG. 5, 556). The processing system is further configured to intercept (FIG. 3, 344; FIG. 4, 410) a data transfer request (FIG. 5, 564) that is initiated by the application (FIG. 1, 112; FIG. 2, 212A-212M; FIG. 3, 312). The data transfer request (FIG. 5, 564) includes an encrypted SNI header (FIG. 5, 566) and a payload (FIG. 5, 568). The data transfer request (FIG. 5, 564) requests establishment of a connection between the application (FIG. 1, 112; FIG. 2, 212A-212M; FIG. 3, 312) and a destination that corresponds to the representation of the IP address (FIG. 5, 560). The processing system is further configured to initiate (FIG. 3, 350; FIG. 4, 412) establishment of the connection between the application (FIG. 1, 112; FIG. 2, 212A-212M; FIG. 3, 312) and the destination by providing the encrypted SNI header (FIG. 5, 566), the payload (FIG. 5, 568), and metadata (FIG. 5, 570) to an enforcement engine (FIG. 1, 118; FIG. 2, 218; FIG. 3, 318) that executes on a server (FIG. 1, 104; FIG. 2, 204) that is between the application (FIG. 1, 112; FIG. 2, 212A-212M; FIG. 3, 312) and the destination. The metadata (FIG. 5, 570) includes the entity name (FIG. 5, 556) based on the mapping (FIG. 5, 522) that cross-references the representation of the IP address (FIG. 5, 560) to the entity name (FIG. 5, 556).

(A2) In the system of A1, wherein the name resolution request is a domain name system (DNS) resolution request.

(A3) In the system of any of A1-A2, wherein the processing system is configured to: intercept the name resolution request using a first process that executes on the computing system; and intercept the data transfer request using a second process that executes on the computing system; and wherein the second process is different from the first process.

(A4) In the system of any of A1-A3, wherein the processing system is configured to intercept the name resolution request and intercept the data transfer request using a same process that executes on the computing system.

(A5) In the system of any of A1-A4, wherein the processing system is configured to: register an application programming interface of an operating system that executes on the processing system to be a proxy such that the application programming interface is configured to receive the name resolution request; and intercept the name resolution request using the application programming interface.

(A6) In the system of any of A1-A5, wherein the processing system is configured to cause the translation of the entity name to the representation the IP address by performing the following operations: forward the name resolution request to the server, which causes the server to use the association between the representation of the IP address and the entity name to translate the entity name to the representation of the IP address; and receive the representation of the IP address from the server.

(A7) In the system of any of A1-A6, wherein the processing system is configured to cause the translation of the entity name to the representation of the IP address by translating the entity name to the representation of the IP address using a process that executes on the computing system.

(A8) In the system of any of A1-A7, wherein the processing system is configured to: encrypt the metadata; and initiate the establishment of the connection between the application and the destination by providing the encrypted SNI header, the payload, and the encrypted metadata to the enforcement engine.

(A9) In the system of any of A1-A8, wherein the representation of the IP address is different from the IP address that is associated with the entity name.

(A10) In the system of any of A1-A9, wherein the processing system is further configured to: determine that the representation of the IP address, as indicated by the data transfer request, corresponds to the entity name based on the mapping that cross-references the representation of the IP address to the entity name; and cause translation of the entity name to the IP address based on an association between the entity name and the IP address; and wherein the metadata further includes the IP address.

(A11) In the system of any of A1-A10, wherein the representation of the IP address is same as the IP address that is associated with the entity name.

(A12) In the system of any of A1-A11, wherein the metadata further includes the representation of the IP address.

(B1) An example method of using entity name mapping for routing network traffic having encrypted server name indication (SNI) headers, which is performed by a computing system (FIG. 1, 102; FIG. 2, 202A-202M; FIG. 5, 500; FIG. 6, 602; FIG. 7, 700), comprises intercepting (FIG. 3, 332; FIG. 4, 402) a name resolution request (FIG. 5, 556) that is initiated by an application (FIG. 1, 112; FIG. 2, 212A-212M; FIG. 3, 312). The name resolution request (FIG. 5, 556) specifies an entity name (FIG. 5, 558) and requests an internet protocol (IP) address associated with the entity name (FIG. 5, 558). The example method further comprises causing (FIG. 3, 334; FIG. 4, 404) translation of the entity name (FIG. 5, 556), which is specified by the name resolution request (FIG. 5, 556), to a representation of the IP address (FIG. 5, 560) based on an association between the entity name (FIG. 5, 556) and the representation of the IP address (FIG. 5, 560). The example method further comprises storing (FIG. 3, 340; FIG. 4, 406) a mapping (FIG. 5, 522) that cross-references the representation of the IP address (FIG. 5, 560) to the entity name (FIG. 5, 556). The example method further comprises informing (FIG. 3, 338; FIG. 4, 408) the application (FIG. 1, 112; FIG. 2, 212A-212M; FIG. 3, 312) that the representation of the IP address (FIG. 5, 560) corresponds to the entity name (FIG. 5, 556). The example method further comprises intercepting (FIG. 3, 344; FIG. 4, 410) a data transfer request (FIG. 5, 564) that is initiated by the application (FIG. 1, 112; FIG. 2, 212A-212M; FIG. 3, 312). The data transfer request (FIG. 5, 564) includes an encrypted SNI header (FIG. 5, 566) and a payload (FIG. 5, 568). The data transfer request (FIG. 5, 564) requests establishment of a connection between the application (FIG. 1, 112; FIG. 2, 212A-212M; FIG. 3, 312) and a destination that corresponds to the representation of the IP address (FIG. 5, 560). The example method further comprises initiating (FIG. 3, 350; FIG. 4, 412) establishment of the connection between the application (FIG. 1, 112; FIG. 2, 212A-212M; FIG. 3, 312) and the destination by providing the encrypted SNI header (FIG. 5, 566), the payload (FIG. 5, 568), and metadata (FIG. 5, 570) to an enforcement engine (FIG. 1, 118; FIG. 2, 218; FIG. 3, 318) that executes on a server (FIG. 1, 104; FIG. 2, 204) that is between the application (FIG. 1, 112; FIG. 2, 212A-212M; FIG. 3, 312) and the destination. The metadata (FIG. 5, 570) includes the entity name (FIG. 5, 556) based on the mapping (FIG. 5, 522) that cross-references the representation of the IP address (FIG. 5, 560) to the entity name (FIG. 5, 556).

(B2) In the method of B1, wherein the name resolution request is a domain name system (DNS) resolution request.

(B3) In the method of any of B1-B2, wherein intercepting the name resolution request comprises: intercepting the name resolution request using a first process that executes on the computing system; wherein intercepting the data transfer request comprises: intercepting the data transfer request using a second process that executes on the computing system; and wherein the second process is different from the first process.

(B4) In the method of any of B1-B3, wherein intercepting the name resolution request and intercepting the data transfer request are performed using a same process that executes on the computing system.

(B5) In the method of any of B1-B4, further comprising: registering an application programming interface of an operating system that executes on the computing system to be a proxy such that the application programming interface is configured to receive the name resolution request; wherein intercepting the name resolution request comprises: intercepting the name resolution request using the application programming interface.

(B6) In the method of any of B1-B5, wherein causing the translation of the entity name to the representation the IP address comprises: forwarding the name resolution request to the server, which causes the server to use the association between the representation of the IP address and the entity name to translate the entity name to the representation of the IP address; and receiving the representation of the IP address from the server.

(B7) In the method of any of B1-B6, wherein causing the translation of the entity name to the representation of the IP address comprises: translating the entity name to the representation of the IP address using a process that executes on the computing system.

(B8) In the method of any of B1-B7, further comprising: encrypting the metadata; wherein initiating the establishment of the connection comprises: initiating the establishment of the connection between the application and the destination by providing the encrypted SM header, the payload, and the encrypted metadata to the enforcement engine.

(B9) In the method of any of B1-B8, wherein the representation of the IP address is different from the IP address that is associated with the entity name.

(B10) In the method of any of B1-B9, further comprising: determining that the representation of the IP address, as indicated by the data transfer request, corresponds to the entity name based on the mapping that cross-references the representation of the IP address to the entity name; and causing translation of the entity name to the IP address based on an association between the entity name and the IP address; wherein the metadata further includes the IP address.

(B11) In the method of any of B1-B10, wherein the representation of the IP address is same as the IP address that is associated with the entity name.

(B12) In the method of any of B1-B11, wherein the metadata further includes the representation of the IP address.

(C1) An example computer program product (FIG. 6, 624; FIG. 7, 718, 722) comprising a computer-readable storage medium having instructions recorded thereon for enabling a processor-based system (FIG. 1, 102; FIG. 2, 202A-202M; FIG. 5, 500; FIG. 6, 602; FIG. 7, 700) to use entity name mapping for routing network traffic having encrypted server name indication (SM) headers by performing operations. The operations comprise intercepting (FIG. 3, 332; FIG. 4, 402) a name resolution request (FIG. 5, 556) that is initiated by an application (FIG. 1, 112; FIG. 2, 212A-212M; FIG. 3, 312). The name resolution request (FIG. 5, 556) specifies an entity name (FIG. 5, 558) and requests an internet protocol (IP) address associated with the entity name (FIG. 5, 558). The operations further comprise causing (FIG. 3, 334; FIG. 4, 404) translation of the entity name (FIG. 5, 556), which is specified by the name resolution request (FIG. 5, 556), to a representation of the IP address (FIG. 5, 560) based on an association between the entity name (FIG. 5, 556) and the representation of the IP address (FIG. 5, 560). The operations further comprise storing (FIG. 3, 340; FIG. 4, 406) a mapping (FIG. 5, 522) that cross-references the representation of the IP address (FIG. 5, 560) to the entity name (FIG. 5, 556). The operations further comprise informing (FIG. 3, 338; FIG. 4, 408) the application (FIG. 1, 112; FIG. 2, 212A-212M; FIG. 3, 312) that the representation of the IP address (FIG. 5, 560) corresponds to the entity name (FIG. 5, 556). The operations further comprise intercepting (FIG. 3, 344; FIG. 4, 410) a data transfer request (FIG. 5, 564) that is initiated by the application (FIG. 1, 112; FIG. 2, 212A-212M; FIG. 3, 312). The data transfer request (FIG. 5, 564) includes an encrypted SNI header (FIG. 5, 566) and a payload (FIG. 5, 568). The data transfer request (FIG. 5, 564) requests establishment of a connection between the application (FIG. 1, 112; FIG. 2, 212A-212M; FIG. 3, 312) and a destination that corresponds to the representation of the IP address (FIG. 5, 560). The operations further comprise initiating (FIG. 3, 350; FIG. 4, 412) establishment of the connection between the application (FIG. 1, 112; FIG. 2, 212A-212M; FIG. 3, 312) and the destination by providing the encrypted SNI header (FIG. 5, 566), the payload (FIG. 5, 568), and metadata (FIG. 5, 570) to an enforcement engine (FIG. 1, 118; FIG. 2, 218; FIG. 3, 318) that executes on a server (FIG. 1, 104; FIG. 2, 204) that is between the application (FIG. 1, 112; FIG. 2, 212A-212M; FIG. 3, 312) and the destination. The metadata (FIG. 5, 570) includes the entity name (FIG. 5, 556) based on the mapping (FIG. 5, 522) that cross-references the representation of the IP address (FIG. 5, 560) to the entity name (FIG. 5, 556).

IV. Example Computer System

FIG. 7 depicts an example computer 700 in which embodiments may be implemented. The user device 102, the edge server 104, and/or any one or more of the servers 106A-106N shown in FIG. 1; any one or more of the user devices 202A-202M, the customer premises equipment 224, the edge server 204, and/or any one or more of the servers 206A-206N shown in FIG. 2; and/or the computing system 500 shown in FIG. 5 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the request interception logic 114, the entity name resolver 116, the enforcement engine 118, the boundary traffic router 226, the request interception logic 214, the entity name resolver 216, the enforcement engine 218, the request interception logic 314, the entity name resolver 316, the enforcement engine 318, the request interception logic 514, the name resolution request interceptor 552, the data transfer request interceptor 554, the request interception logic 692, activity diagram 300 (including any activity of activity diagram 300), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use entity name mapping for routing network traffic having encrypted server name indication (SNI) headers, the system comprising:
   a memory; and
   a processing system coupled to the memory, the processing system configured to:
      intercept a name resolution request that is initiated by an application, the name resolution request specifying an entity name and requesting an internet protocol (IP) address associated with the entity name;
      cause translation of the entity name, which is specified by the name resolution request, to a representation of the IP address based on an association between the entity name and the representation of the IP address;
      store a mapping that cross-references the representation of the IP address to the entity name;
      inform the application that the representation of the IP address corresponds to the entity name;
      intercept a data transfer request that is initiated by the application, the data transfer request including an encrypted SNI header and a payload, the data transfer request requesting establishment of a connection between the application and a destination that corresponds to the representation of the IP address; and
      initiate establishment of the connection between the application and the destination by providing the encrypted SNI header, the payload, and metadata to an enforcement engine that executes on a server that is between the application and the destination, the metadata including the entity name based on the mapping that cross-references the representation of the IP address to the entity name, wherein providing the metadata, which includes the entity name, to the enforcement engine enables the enforcement engine to deliver the payload to the destination even though the encrypted SNI header is unusable by the enforcement engine to identify the destination as a result of the encrypted SNI header being encrypted.

2. The system of claim 1, wherein the name resolution request is a domain name system (DNS) resolution request.

3. The system of claim 1, wherein the processing system is configured to:
   intercept the name resolution request using a first process that executes on the computing system; and
   intercept the data transfer request using a second process that executes on the computing system; and
   wherein the second process is different from the first process.

4. The system of claim 1, wherein the processing system is configured to intercept the name resolution request and intercept the data transfer request using a same process that executes on the computing system.

5. The system of claim 1, wherein the processing system is configured to:
   register an application programming interface of an operating system that executes on the processing system to be a proxy such that the application programming interface is configured to receive the name resolution request; and
   intercept the name resolution request using the application programming interface.

6. The system of claim 1, wherein the processing system is configured to cause the translation of the entity name to the representation the IP address by performing the following operations:
   forward the name resolution request to the server, which causes the server to use the association between the representation of the IP address and the entity name to translate the entity name to the representation of the IP address; and
   receive the representation of the IP address from the server.

7. The system of claim 1, wherein the processing system is configured to cause the translation of the entity name to the representation of the IP address by translating the entity name to the representation of the IP address using a process that executes on the computing system.

8. The system of claim 1, wherein the processing system is configured to:
   encrypt the metadata; and
   initiate the establishment of the connection between the application and the destination by providing the encrypted SNI header, the payload, and the encrypted metadata to the enforcement engine.

9. The system of claim 1, wherein the representation of the IP address is different from the IP address that is associated with the entity name.

10. The system of claim 9, wherein the processing system is further configured to:
    determine that the representation of the IP address, as indicated by the data transfer request, corresponds to the entity name based on the mapping that cross-references the representation of the IP address to the entity name; and
    cause translation of the entity name to the IP address based on an association between the entity name and the IP address; and
    wherein the metadata further includes the IP address.

11. The system of claim 1, wherein the representation of the IP address is same as the IP address that is associated with the entity name.

12. The system of claim 11, wherein the metadata further includes the representation of the IP address.

13. A method of using entity name mapping for routing network traffic having encrypted server name indication (SNI) headers, the method performed by a computing system, the method comprising:
    intercepting a name resolution request that is initiated by an application, the name resolution request specifying an entity name and requesting an internet protocol (IP) address associated with the entity name;

causing translation of the entity name, which is specified by the name resolution request, to a representation of the IP address based on an association between the entity name and the representation of the IP address;

storing a mapping that cross-references the representation of the IP address to the entity name;

informing the application that the representation of the IP address corresponds to the entity name;

intercepting a data transfer request that is initiated by the application, the data transfer request including an encrypted SNI header, which is an SNI header that is encrypted as required by a transport layer security protocol, and a payload, the data transfer request requesting establishment of a connection between the application and a destination that corresponds to the representation of the IP address; and initiating establishment of the connection between the application and the destination by providing the encrypted SNI header, the payload, and metadata to an enforcement engine that executes on a server that is between the application and the destination, the metadata including the entity name based on the mapping that cross-references the representation of the IP address to the entity name, wherein providing the metadata, which includes the entity name, to the enforcement engine enables the enforcement engine to deliver the payload to the destination even though the transport layer security protocol requiring the SNI header to be encrypted causes the enforcement engine to be unable to identify the destination from the SNI header.

14. The method of claim 13, wherein the name resolution request is a domain name system (DNS) resolution request.

15. The method of claim 13, wherein intercepting the name resolution request comprises:
   intercepting the name resolution request using a first process that executes on the computing system;
   wherein intercepting the data transfer request comprises:
      intercepting the data transfer request using a second process that executes on the computing system; and
   wherein the second process is different from the first process.

16. The method of claim 13, wherein intercepting the name resolution request and intercepting the data transfer request are performed using a same process that executes on the computing system.

17. The method of claim 13, further comprising:
   registering an application programming interface of an operating system that executes on the computing system to be a proxy such that the application programming interface is configured to receive the name resolution request;
   wherein intercepting the name resolution request comprises:
      intercepting the name resolution request using the application programming interface.

18. The method of claim 13, wherein the representation of the IP address is different from the IP address that is associated with the entity name;
   wherein the method further comprises:
      determining that the representation of the IP address, as indicated by the data transfer request, corresponds to the entity name based on the mapping that cross-references the representation of the IP address to the entity name; and
      causing translation of the entity name to the IP address based on an association between the entity name and the IP address; and
   wherein the metadata further includes the IP address.

19. The method of claim 13, wherein the representation of the IP address is same as the IP address that is associated with the entity name; and
   wherein the metadata further includes the representation of the IP address.

20. A computer program product comprising a computer-readable storage medium having instructions recorded thereon for enabling a processor-based system to use entity name mapping for routing network traffic having encrypted server name indication (SNI) headers by performing operations, the operations comprising:
   intercepting a name resolution request that is initiated by an application, the name resolution request specifying an entity name and requesting an internet protocol (IP) address associated with the entity name;
   causing translation of the entity name, which is specified by the name resolution request, to a representation of the IP address based on an association between the entity name and the representation of the IP address;
   storing a mapping that cross-references the representation of the IP address to the entity name;
   informing the application that the representation of the IP address corresponds to the entity name;
   intercepting a data transfer request that is initiated by the application, the data transfer request including an encrypted SNI header, which is an SNI header that is encrypted as required by a transport layer security protocol, and a payload, the data transfer request requesting establishment of a connection between the application and a destination that corresponds to the representation of the IP address; and
   initiating establishment of the connection between the application and the destination by providing the encrypted SNI header, the payload, and metadata to an enforcement engine that executes on a server that is between the application and the destination, the metadata including the entity name based on the mapping that cross-references the representation of the IP address to the entity name, wherein providing the metadata, which includes the entity name, to the enforcement engine enables the enforcement engine to deliver the payload to the destination even though the transport layer security protocol prevents the enforcement engine from decrypting the encrypted SNI header based on the enforcement engine and the destination being different.

* * * * *